Patented June 17, 1947

2,422,356

UNITED STATES PATENT OFFICE 2,422,356

RESINOUS INTERESTERIFICATION PRODUCT MADE WITH HYDROXYLATED FATTY OIL

Edward A. Lasher, Los Angeles, Calif., assignor to California Flaxseed Products Company, Los Angeles, Calif., a corporation of California No Drawing. Application March 15, 1943, Serial No. 479,252

8 Claims. (Cl. 260—22)

This invention relates to a new soft resinous material and to the process of making the same.

The object of my invention is to provide soft resinous materials having low solubility in aromatic and aliphatic hydrocarbon solvents, and having high stability to changes of consistency with time under the conditions of use. Another object is to provide a soft resinous material which remains flexible at low temperatures. Another object is to provide a softener and plasticizer for rubbers, particularly for the insoluble hard synthetic rubbers. Still another object is to provide a base material for a seaming or master compound adaptable for use from the lowest to the highest atmospheric temperatures, characterized by high stability and insolubility in mixtures of aromatic and aliphatic hydrocarbons such as aviation gasoline. Another object is to provide non-drying synthetic resins having elastic rubber-like properties.

I have discovered that new synthetic resins having valuable and unique properties result from the ineraction and polymerization under suitable conditions of glycol esters of polybasic carboxylic acids, hydroxylated oils, and hydroxy aliphatic carboxylic acids. The latter acids are preferably polybasic hydroxy acids or mixtures of these with hydroxy monobasic acids, and different from the acid radicles in the glycol esters.

The resins of my invention may be prepared by a two stage process consisting first of mixing and heating the hydroxy aliphatic carboxylic acids and the hydroxylated oils until the partial interaction of the acid and hydroxyl groups has occurred, and then, second, further interacting and polymerizing the resulting acid resin with a glycol ester of a polybasic carboxylic acid. My product is not produced when the three ingredients are mixed and heated together in a single step process.

The term "hydroxylated oils" as used herein includes the natural fatty oils which have free hydroxyl groups, for example raw castor oil, and also the oils which are obtained by "blowing" certain vegetable and fish oils (those having unsaturated carbon bonds) for example castor oil, linseed oil, rape oil, sardine oil, and the like. It is well known that "blowing" causes an increase in the hydroxyl group content over that of the original oil, as evidenced by the increase in the "acetyl" number. Blowing also produces a marked increase in the viscosity of the oil, and viscosity is a rough measure of the amount of blowing and hence the increase in hydroxyl group content. Oils which have been otherwise treated to increase their hydroxyl content may also be used. I prefer to use blown castor oil in producing my resins because of its availability, high viscosity, and reactiveness in the reactions of this invention.

As an illustration of my invention, I have mixed together:

Example 1

(A)

| | Parts by weight |
|---|---|
| Blown castor oil | 20 |
| Citric acid | 11 |

These ingredients were heated slowly to 400° F. and held at that temperature for approximately one-half hour, or until the acid number was about 250. This intermediary acid resin (A) was then mixed with diethylene glycol phthalate in the proportions:

| | Parts by weight |
|---|---|
| Acid resin "A" | 48 |
| Diethylene-glycol-phthalate (acid number 25) | 52 |

This mixture was then re-heated gradually to about 400° F. and held there for about 2½ hours. Further interaction and polymerization resulted, and upon cooling, a homogeneous viscous resinous product was produced, which is strongly tacky, somewhat elastic, non-hygroscopic and non-drying. It is quite insoluble in aliphatic and aromatic hydrocarbon solvents.

Raw castor oil, and also blown linseed oil were substituted for the blown castor oil in the above composition and the products were similar although higher temperatures were required to get products of the same consistency.

Malic acid may be used in place of citric acid in the above composition, and substantially the same type resins results.

The term "polybasic carboxylic acid" as used in these specifications and claims is meant to include those acids having two or more active carboxyl groups; and the term "hydroxy" is used to include one or more active hydroxyl groups.

By replacing part of the hydroxy polybasic acid with a hydroxy monobasic aliphatic acid such as lactic acid, the interpolymer ester resins have improved stability, and if otherwise made under the same conditions of reaction, the resin containing lactic acid is softer than where the hydroxy poly-basic acids alone are used.

Example II

As another illustration of my invention, I have mixed together (A)

| | Parts by weight |
|---|---|
| Blown castor oil | 60 |
| Citric acid | 36 |
| Lactic acid (water free basis) | 19 |

The mixture was heated while being constantly stirred, to 200° F. in the first hour; from 280 to 320 in another hour; and from 320 to 360° F. in the third hour. The temperature was maintained at 360° F. until the acid number was about 230, which required about one-half hour. The product when cold is a homogeneous, clear, amber colored, sticky semi-solid. This intermediary resin (A) was then heated with diethylene-glycol-phthalate in the proportions of

| | Parts by weight |
|---|---|
| Resin "A" as above | 12 |
| Diethylene glycol phthalate of acid number about 25 | 13 |

This mixture was heated in an open kettle with mechanical stirring to a temperature of 400° F. in about three hours, and then held at 400° F. for 2¾ hours, and then cooled. A homogeneous soft flexible gel formed, which may be remelted on heating again. The product is strongly tacky, somewhat elastic, non-hygroscopic, and non-drying. It is not dissolved or appreciably swelled by either aliphatic or aromatic hydrocarbon solvents. The acid number is about 65.

The proportions of ethylene glycol phthalate to acid resin may be varied to give various products. For example, when the diethylene glycol phthalate is increased to seventy parts to thirty parts of the acid resin (A), and then heated as described, the product has an acid number of about 20 and is somewhat less soluble in aromatic and aliphatic hydrocarbons, has lower viscosity, and more tackiness.

*Example III*

Another illustration of my resin consists of a composition of 48 parts of the acid resin "A" of Example II.
52 parts by weight of diethylene glycol adipate (acid Number 10 or less).

This mixture was heated in an open kettle with continuous stirring to 400° F. in about 1¼ hours and held at 400° F. for 2¾ hours. The product is an elastic resin, soft at room temperature, and has good low temperature flexibility. It is quite insoluble in aviation gasoline. When used as a rubber plasticizer, it works easily into the rubber at roll temperatures, and imparts low temperature flexibility to the cured rubber mixtures. Rubber compositions containing this plasticizer are also resistant to aromatic and hydrocarbon solvents.

The consistency, insolubility and other properties may be varied by changes in the proportions of hydroxylated oil, acids, and glycol esters; by varying the rate and temperature of heating both in the intermediary acid resin and in the final product; by varying the completeness of the esterification reaction as measured by the acid number; and by using blown oil having different degrees of "blowing," i. e. different degrees of hydroxylation.

In the case of blown castor oil of viscosity, (Saybolt 210°) 285, the proportion of the oil to acid or acids, in the intermediary acid resin, may be varied from a ratio of about 2 parts of oil to one of acids, to a ratio of 1 part oil to 2 of acids. In general, the higher the proportion of acid, the greater is the viscosity of the product and the lower is the hydrocarbon solubility, the stability, and the resistance to water. I prefer to use such a mixture of all the ingredients that there results a slight excess of carboxyl groups over the reactive hydroxyl groups, when the reaction of esterification and polymerization has been carried to the desired state of completion. The acid number of the final product may vary from about 10 to 70.

Any one or a mixture of the ethylene glycol esters may be used in my reaction, but in order to increase the interchange of acid radicals and cross-linking in the esterification and polymerization reactions which enter into the formation of the molecules of my product, I prefer to use an ester whose acid radical is different from those of the acid ingredients. It is also advantageous to use an ethylene glycol ester which has a high boiling point and whose fluidity at the reaction temperature keeps the reaction mass fluid and therefore mixable until the desired esterification and interpolymerization has taken place. As the products are generally viscous and rubbery in character, this fluidity in the latter stages of the reaction is important in saving manufacturing time, and in giving uniformity of reaction throughout the mass. The proportions of the ethylene glycol ester to the other ingredients may be varied in the range from about one part by weight of ester to two parts acid resin, to two parts of ester to one of acid resin. I prefer about equal parts. The use of higher proportions of the ester lowers the viscosity, and decreases the hydrocarbon solubility.

The resins of my composition may be used in synthetic and natural rubber compositions, and impart valuable characteristics thereto, such as better working and better tackiness on the mill, improved softness and plasticity, improved pliability at low temperatures, and low solubility in aromatic and aliphatic hydrocarbon solvents. For example, the product shown above as Example II when used with hard synthetic rubbers in amounts up to 30 percent of the rubber content, does not greatly detract from the physical strength and characteristics of the cured rubber compositions.

These resins may also be used in mastic compositions for which purpose they are mixed with inert fillers such as asbestos fibers and the like, and the mastic so produced may be used for a seaming compound or sealing compound characterized by freedom from brittleness at extreme low atmospheric temperatures, and by low solubility in mixed hydrocarbon solvents. These properties are important for materials used in the construction of airplanes.

While I have illustrated my invention by specific examples, I do not wish to be limited thereby, but restrict my invention only insofar as required by the prior art and the spirit of the appended claims.

I claim:
1. A resin consisting of an interesterification and interpolymerized product of (1) an ester of blown castor oil with a mixture of citric acid and lactic acid, and (2) diethylene glycol phthalate, the proportion of said castor oil-citric acid-lactic acid ester to diethylene glycol phthalate being in the range from 1:2 to 2:1 parts by weight.

2. A resin comprising an interesterification and interpolymerized product of (1) an ester of blown castor oil with a mixture of citric acid and lactic acid, and (2) diethylene glycol adipate, the proportion of said castor oil-citric acid-lactic acid ester to diethylene glycol adipate being in the range from 1:2 to 2:1 parts by weight.

3. The method of making resins comprising heating a mixture of an acid ester of an hydroxylated fatty glyceride oil and an acid component selected from the group consisting of citric acid, malic acid, citric acid with lactic acid, in suitable proportions to form an acid resin, and then heating said acid resin with a diethylene glycol ester of an acid selected from the group consisting of phthalic acid and adipic acid, in proportions so that there is a slight excess of reactive carboxyl groups over reactive hydroxyl groups, heating the mixture to about 400° F. until substantially complete esterification has taken place as indicated by the low acid number of the product, and then stopping the reaction by cooling the product.

4. The method of making resins comprising heating a mixture of an acid ester of blown castor oil with a mixture of citric and lactic acids, in suitable proportions to form an acid resin, and then heating said acid resin with a diethylene glycol phthalate in proportions so that there is a slight excess of reactive carboxyl groups over reactive hydroxyl groups, heating the mixture to about 400° F. until substantially complete esterification has taken place as indicated by the low acid number of the product, and then stopping the reaction by cooling the product.

5. The method of making resins comprising heating a mixture of an acid ester of blown castor oil with citric acid in suitable proportions to form an acid resin, and then heating said acid resin with a diethylene glycol phthalate in proportions so that there is a slight excess of reactive carboxyl groups over reactive hydroxyl groups, heating the mixture to about 400° F. until substantially complete esterification has taken place as indicated by the low acid number of the product, and then stopping the reaction by cooling the product.

6. A resin consisting of an interesterification and interpolymerized product of (1) an acid ester of an hydroxylated fatty glyceride oil with an acid component selected from the group consisting of citric acid, malic acid, and citric acid with lactic acid, and (2) a diethylene glycol ester of an acid selected from the group consisting of phthalic acid and adipic acid; the proportions of said acid ester to said diethylene glycol ester being in the range from 1:2 to 2:1 parts by weight.

7. A resin consisting of an interesterification and interpolymerized product of (1) an acid ester of an hydroxylated fatty glyceride oil with citric acid, and (2) a diethylene glycol ester of a dicarboxylic acid selected from the group consisting of phthalic acid and adipic acid; the proportions of said acid ester to said diethylene glycol ester being in the range from 1:2 to 2:1 parts by weight.

8. A resin consisting of an interesterification and interpolymerized product of (1) an acid ester of an hydroxylated fatty glyceride oil with malic acid, and (2) a diethylene glycol ester of a dicarboxylic acid selected from the group consisting of phthalic acid and adipic acid; the proportions of said acid ester to said diethylene glycol ester being in the range from 1:2 to 2:1 parts by weight.

EDWARD A. LASHER.

REFERENCES CITED

The following references are of record in the file of this patent:

UNITED STATES PATENTS

| Number | Name | Date |
| --- | --- | --- |
| 1,785,930 | Bradley | Dec. 23, 1930 |
| 2,317,668 | Cheetham | Apr. 27, 1943 |
| 2,230,351 | Hill | Feb. 4, 1941 |

FOREIGN PATENTS

| Number | Country | Date |
| --- | --- | --- |
| 397,405 | Great Britain | Aug. 24, 1933 |